Dec. 12, 1939.   W. W. LARGE   2,183,024
ROTARY VALVE FOR ENGINES
Filed March 30, 1938   2 Sheets-Sheet 2
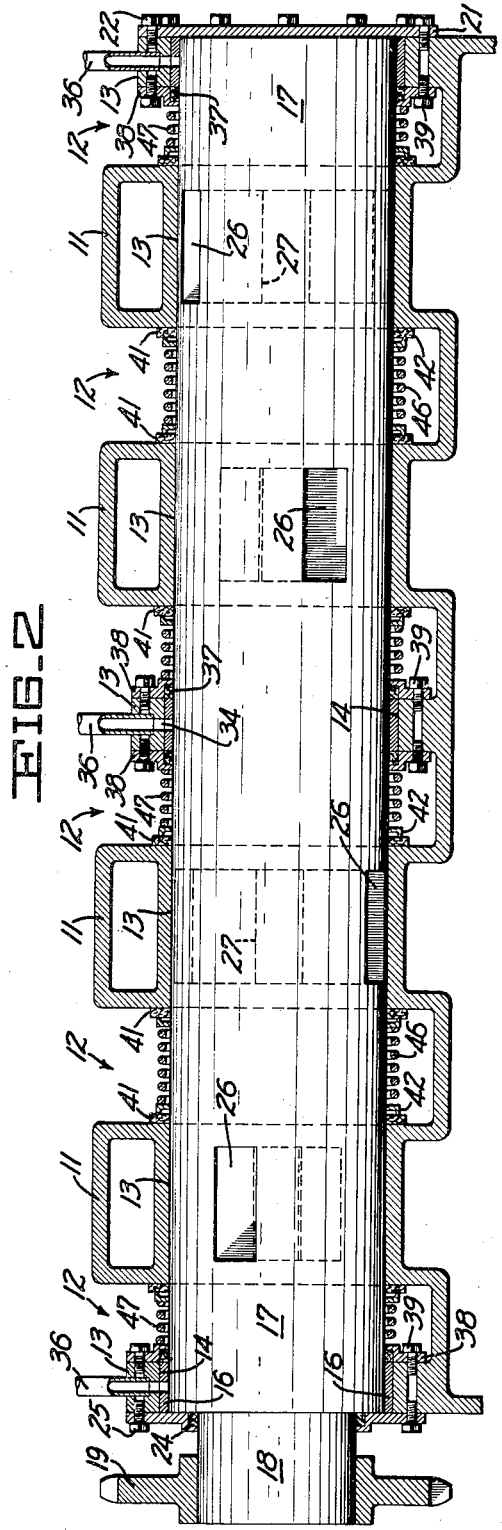
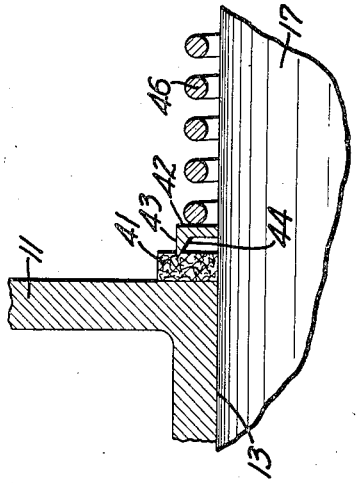
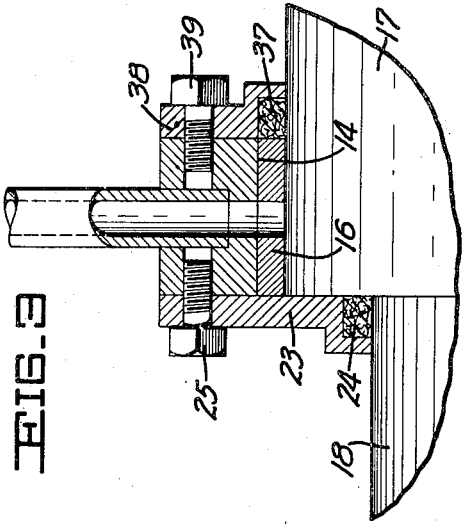
INVENTOR
William W. Large
BY
Harry C. Schroeder
ATTORNEY

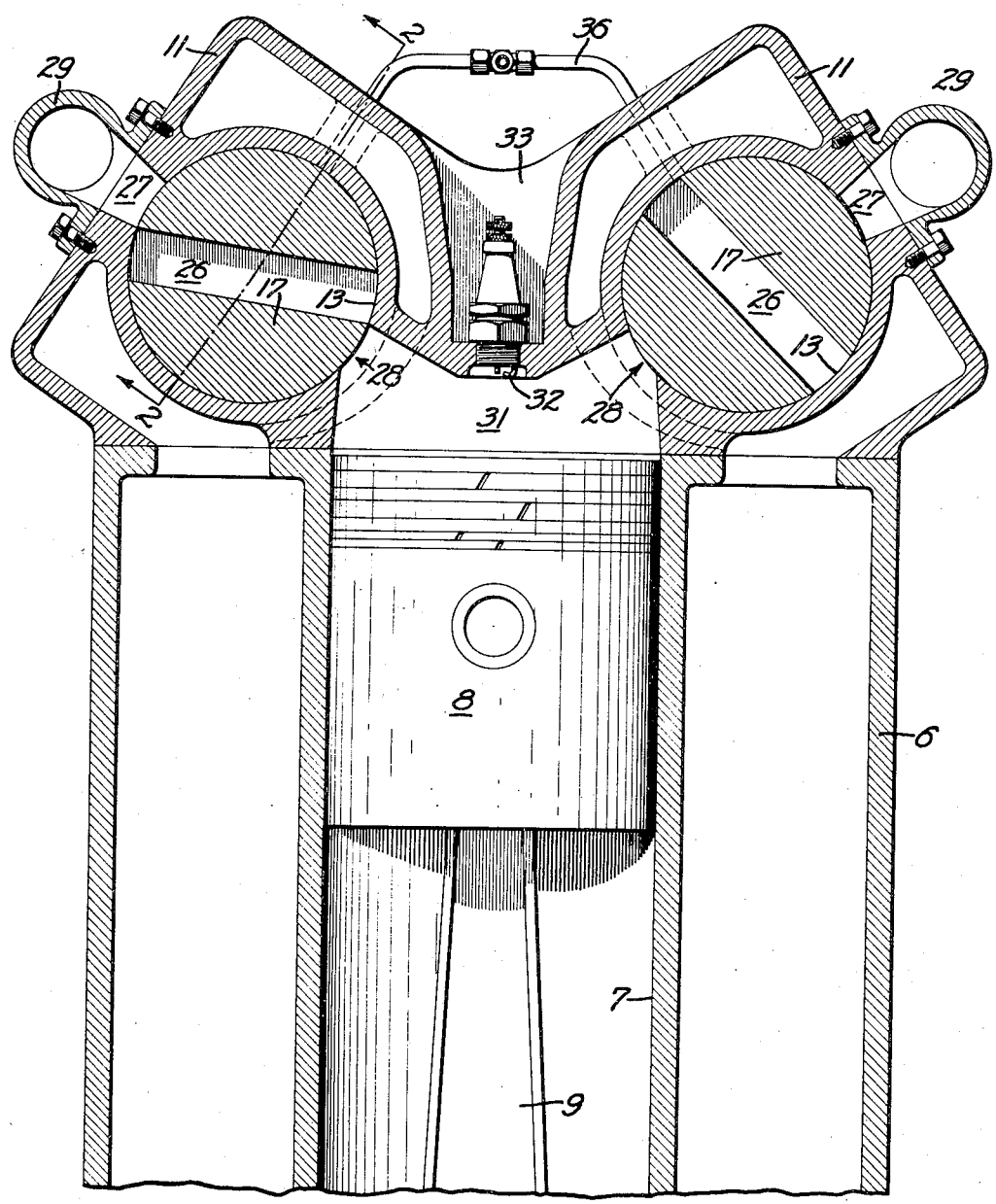

Patented Dec. 12, 1939

2,183,024

UNITED STATES PATENT OFFICE 2,183,024

ROTARY VALVE FOR ENGINES

William W. Large, Oakland, Calif.

Application March 30, 1938, Serial No. 198,894

2 Claims. (Cl. 123—190)

This invention relates to the structure of fluid powered engines and particularly to the valving mechanism thereof.

It is an object of the invention to provide effective, conveniently accessible means in a rotary valve for engines which obviates gaseous or fluid leakage from within the working cylinder to the outer atmosphere.

Another object of the invention is to provide an improved bearing structure for rotary valves, used particularly in internal combustion engines, which, unlike the bearings in the usual rotary valve construction that are affected by the changing pressure and heat of the gases passing through the valves with the result that lubricating oil is rapidly driven or sucked from the bearing into the combustion chamber of the engine, is isolated from the valve by a neutral pressure zone which serves as a barrier shielding the bearing from the alternating pressure and vacuum of the combustion chamber.

The invention possesses other objects and features of advantage, some of which, together with the foregoing, will be specifically set forth in the detailed description of the invention hereunto annexed. It is to be understood that the invention is not to be limited to the particular species thereof shown and described as various other embodiments thereof may be employed within the scope of the appended claims.

Referring to the drawings:

Figure 1 is a vertical sectional view of a portion of an internal combustion engine cylinder block showing a cylinder head, incorporating the improved rotary valve structure of my invention, mounted thereon.

Figure 2 is a vertical sectional view, partly in side elevation, showing one complete valve unit for a four cylinder engine. The unit shown is typical of both the intake and exhaust valves. The plane of section is indicated by the line 2—2 of Fig. 1.

Figure 3 is an enlarged fragmental vertical sectional view showing one of the valve rotor bearings.

Figure 4 is an enlarged fragmental vertical sectional view of one of the valve seals.

I am aware that rotary valves for cycling fluid pressure engines, both of the steam and internal combustion variety, have long been known in the art. The present invention does not deal with such a valve in its entirety but is only concerned with the sealing of the valve rotor against the leakage therearound of the fluid media which powers the engine and with the bearing structure for rotatably supporting the rotor. There have been two major defects in the construction of known rotary valve structures which have prevented efficient operation thereof and consequently have contributed to the failure of this type of valve to be recognized and extensibly used by the trade. The first of these is the inability, without the use of complicated structures generally inaccessible readily for repair, to efficiently seal the valves against leakage of the gas or vapor, used to drive the engine, either past the valves or to the outer atmosphere with a subsequent loss of power. The second, and by far the more serious of the two defects, centers around the bearing structures in which the valve rotor is journaled. Heretofore it has been the practice to enclose the bearings, together with the valves, in a unitary housing, suitable packing glands being of course provided for the bearings to prevent the free flow of lubricating oil therefrom along the valve rotor. Due to the high pressures created by the exploding fuel charge in the engine cylinder, and to the vacuum existing during the intake of successive fuel charges to the cylinder, the bearings, due to their close proximity to the valves, were subjected to these widely changing degrees of pressure since the packing glands with which they were equipped were not designed to withstand these pressures. The result was that during the intake stroke of the engine, when a vacuum existed in the cylinder, some of the lubricating oil was drawn past the packing gland into the valve and the cylinder and during the compression and expansion strokes, when high pressure was present in the cylinder, the lubricating oil was forced from the bearing either into the valve of the adjoining cylinder or back into the oil feed pipe. It is thus apparent that the bearings, when the engine is running, are not properly lubricated which results in rapid wear and in rapid consumption of the lubricating oil. Since the valves become quite hot during operation of the engine, the oil which is drawn into the valves becomes carbonized, builds up in the narrow clearance space between the valve rotor and the cylinder head, and causes the rotor to stick and sometimes to seize the cylinder head which results in incapacitating the engine, possible parts breakage and disassembling of the entire cylinder head in order to correct the difficulty. I have provided an improved construction for rotary valves which corrects these undesirable features in a large measure.

Describing the invention in detail, the numeral 6 represents, generally, the engine block which is provided with one or more cylinders 7 each having the usual piston 8 slidable therein and a connecting rod 9 which connects the piston to the crankshaft, not shown, in the usual manner. While I have chosen to illustrate the invention as applied to an internal combustion engine, it is to be understood that the structure which will presently be described may be used on any type of reciprocating engine whether it be powered by explosive gas, air or steam.

Connected by bolts or studs to the upper end of the cylinder block 6 in the usual manner is a substantially V-shaped cylinder head comprising a unitary casting having, as shown in Figure 2, a pair of parallel rows of valve housings 11 having open spaces 12 therebetween. Bearing housings 13 forming integral parts of the cylinder head are positioned at opposite ends of each row of valve housings and at the center of each row in one of the spaces 12 between the valve housings. One row of valve housings accommodates the intake valves and the other row the exhaust valves and, since each set of valves is identical in structure, it is necessary to describe only one of them in detail. Each of the valve housings is provided with a cylindrical bore 13 and each of the bearing housings has a bore 14 into which is pressed a bearing liner 16. Each of the valve housing bores and the bearing liners are axially alined and extending through them and adapted to revolve therein is a valve rotor 17. One end of the rotor is provided with a portion 18 of reduced diameter to which is attached a sprocket 19, or other suitable driving member, which may be connected by a chain, or otherwise, to be rotatably driven from the crankshaft or the timing gearing of the engine. A thrust plate 21 secured by capscrews 22 to one of the end bearing housings 13 prevents axial movement of the valve rotor in one direction and a thrust plate 23 provided with a packing gland 24, which prevents oil leakage from the other end bearing 13, is secured by capscrews 25 to the latter end bearing to prevent axial movement of the valve rotor in the opposite direction. The valve rotor is provided with a plurality, equal to the number of cylinders of the engine, of transverse passages 26 which are positioned within the valve housings 11 and which register when the rotor is revolving with ports 27 and 28 the former of which is in communication with the intake or exhaust manifold 29 as the case may be and the later of which communicates with the combustion chamber 31 above the piston 8. Thus, when one of the rotors moves to bring a passage 26 thereof into registry with the ports 27 and 28, a fuel charge may be admitted to the combustion chamber 31 where it may be fired by the spark plug 32, or other igniting device, which is positioned in a well 33 formed in the cylinder head and has its electrodes entering the combustion chamber. After firing of the fuel charge, and the expenditure of its expansive force on the piston, the opposite valve rotor will move to aline one of its passages 26 with the ports 27 and 28 whereupon the burnt gases will flow into the exhaust manifold.

Each of the rotor bearing housings 13 is provided with a passage 34 which is in communication with a lubricating oil supply line 36 through which oil under pressure from the main oil circulating system of the engine is led to each of the rotor bearings, and to prevent leakage of the oil from the bearings, packing glands 37, which are formed in plates 38 secured to the bearing housings 13 by capscrews 39, are provided.

Means is provided for sealing the interstice between the periphery of the rotor and the surface of the valve housing bore at the end of the latter against the leakage of fluid therethrough. Positioned on the rotor at each face of a bearing housing is a sealing ring 41, composed of compressed, fibrous material such as asbestos and a suitable binder, one side of which bears against the face of the bearing housing and the bore of which bears against the periphery of the rotor. A compression ring 42 which has a peripheral rim 43 provided with a knife edge, formed by an inwardly sloping surface 44, is disposed about the shaft with the knife edge bearing against the exposed surface of the sealing ring 41. In the spaces 12 between the valve housings which contain no bearing housing, a coil spring 46 is provided whose opposite ends rest against the opposed compression rings 42 and coil springs 47 are provided in the other spaces, one end of each of which bears against a compression ring and the other end of which bears against one of the plates 38. Each spring urges the compression ring axially of the shaft toward the valve housing thereby causing the knife edge of the ring to enter the sealing ring, as shown in Figure 4, thereby causing, due to movement of the sloping surface 44 of the ring 43 into the sealing ring, compaction of the sealing ring which will force it along a thrust line at about 45 degrees with respect to the angularly disposed surfaces of the rotor and the valve housing against these surfaces with the result that the crevice at the end of the bore 13 will be tightly sealed.

It will be noted that the rotor bearings are separated from the valve housings by zones of atmospheric pressure. Thus in no manner can the oil in the bearings be sucked or driven therefrom by the high vacuums or pressures of the gases passing through the valves and consequently the danger of sticking valves caused by the accumulation of hard carbon between the bearing surfaces of the valve rotor and the peripheries of the valve housing bores is eliminated. Also the starvation of the bearings from lack of oil due to the latter being driven or sucked from the bearings is also obviated. It will also be noted that the valve sealing rings and their compression springs are positioned so that they may be readily inspected from time to time to observe wear therein and that by withdrawing the rotor they may be quickly and easily replaced.

I claim:

1. In a rotary valve structure for engines, comprising a unitary engine head having thereon at least a pair of spaced valve housings and a bearing housing disposed intermediate of and spaced from said valve housings, said housings having alined bores therein, a rotor passing through and journaled in said bearing and valve housings, valving means in said rotor and positioned within said valve housings for controlling the flow of a fluid under pressure through the valve housings, means to supply oil under pressure to said bearing housing, and the spaces between the spaced valve and bearing housings being maintained at a constant pressure differing from the pressure of the fluid passing through said valve housings and the pressure of the oil in said bearing housing.

2. In a rotary valve structure for engines, comprising a unitary engine head having thereon at least a pair of spaced valve housings and a bearing housing disposed intermediate of and spaced from said valve housings, said housings having alined bores therein, a rotor passing through and journaled in said bearing and valve housings, valving means in said rotor and positioned within said valve housings for controlling the flow of a fluid under pressure through the valve housings, means to supply oil under pressure to said bearing housing, the spaces between the spaced valve and bearing housings being maintained at a constant pressure differing from the pressure of the fluid passing through said valve housings and the pressure of the oil in said bearing housing, and means for sealing both ends of said valve and bearing housing bores to preclude communication between said bores and the spaces between said housings.

WILLIAM W. LARGE.